(12) United States Patent
Laussermair et al.

(10) Patent No.: US 6,324,353 B1
(45) Date of Patent: Nov. 27, 2001

(54) DOCUMENT VERIFICATION AND TRACKING SYSTEM FOR PRINTED MATERIAL

(75) Inventors: Thomas Laussermair; Abhijit Bhattacharya, both of Delray, FL (US); Michael Schmitt; Tony Ribeiro, both of Boca Raton, FL (US); Frank Lorenz, Poing (DE); Leon T. Dietz, Apple Valley, MN (US)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/650,424

(22) Filed: Aug. 29, 2000

Related U.S. Application Data (63) Continuation-in-part of application No. 09/394,546, filed on Sep. 13, 1999, now Pat. No. 6,137,967.

(51) Int. Cl.⁷ .................................................. G03G 15/00
(52) U.S. Cl. ............................ 399/16; 358/462; 382/112; 399/15; 399/384
(58) Field of Search ............................... 399/1, 2, 3, 15, 399/16, 38, 49, 361, 364, 384, 306; 347/107; 358/462, 474, 498; 382/112, 181, 183

(56) References Cited

U.S. PATENT DOCUMENTS

| | | | |
|---|---|---|---|
| 4,027,142 | 5/1977 | Paup et al. | 235/379 |
| 4,563,086 | 1/1986 | Knapp et al. | 399/49 |
| 4,980,719 | 12/1990 | Allen et al. | 399/3 |
| 5,025,483 | 6/1991 | Dinan et al. | 382/318 |
| 5,132,808 | 7/1992 | Higuchi et al. | 358/403 |
| 5,235,652 | 8/1993 | Nally | 382/112 |
| 5,299,026 | 3/1994 | Vincett et al. | 358/401 |
| 5,337,122 | 8/1994 | Hubble, III et al. | 399/49 |
| 5,488,458 | * 1/1996 | Benedict et al. | 399/15 |
| 5,506,663 | 4/1996 | Ulrich et al. | 399/151 |
| 5,577,811 | 11/1996 | Kobayashi et al. | 297/452.15 |
| 5,635,698 | 6/1997 | Terada | 235/462 |
| 5,778,297 | 7/1998 | Reichl et al. | 399/384 |
| 5,805,967 | * 9/1998 | Bock et al. | 399/299 |
| 6,137,967 | * 10/2000 | Laussermair et al. | 399/16 |

FOREIGN PATENT DOCUMENTS

WO 99/24877    5/1999    (WO).

* cited by examiner

*Primary Examiner*—Sophia S. Chen
(74) *Attorney, Agent, or Firm*—Schiff Hardin & Waite (57) ABSTRACT

In a multifunctional printing method and printing system, printed material is checked, verified and tracked. For that purpose different test equipments are located in-line with a printing line. Magnetic information being printed by a printing station onto the recording carrier using magnetic ink character readable toner may be in-line tested by a magnetic test equipment, which reads information from the magnetic recording zone on the carrier. Optical information may be tested by an in-line mounted optical test equipment, respectively. Further in-line test equipment is proposed such as a laser bar code scanner and an address reader. The printing line may have additional devices such as print preprocessing unwinders or print postprocessing stackers, folders or cutters.

48 Claims, 7 Drawing Sheets

DOCUMENT VERIFICATION AND TRACKING SYSTEM FOR PRINTED MATERIAL

RELATED APPLICATION

An electrophotographic printing system adapted to use various developer stations for different kinds of toner has been described by the Applicants of the present application already in WO-A-99/24877 (U.S. Ser. No. 09/254,292, now U.S. Pat. No. 6,236,816).

This application is a continuation-in-part of previous application Ser. No. 09/394,546 filed Sep. 13, 1999 now U.S. Pat. No. 6,137,967, for "Document Verification And Tracking System For Printed Material".

BACKGROUND OF THE INVENTION

This invention relates to printing systems. In particular, the invention relates to a printing system which is adapted to produce printed documents with high speed, whereby the printing data are provided from a variable print data source and the printing system is a kind of production line.

In today's high speed printing environment the assurance of document verification and process control is increasing. However, according to a further demand, the printing speed should not be significantly reduced by any inspection techniques. The speed of a single high-speed printer normally exceeds 50 DIN A 4 pages per minute. Its speed may even be some hundreds up to a thousand DIN A 4 pages (images) per minute and—by further development of high speed variable data printers—may even increase to still higher printing speeds.

To further increase the printing speed of variable data printing lines, it has been proposed to perform printing of documents over two or more printers. In particular, this may apply to printers printing on fanfold recording carriers, whereby the carrier already printed by a first printer is subsequently fed to a second printer for a second printing process. The first printer may print onto a first side (front side) of the printing carrier while the second printer may print onto the reverse side of the carrier. Alternatively, the first and second printers may print on the same side of the carrier, but the printers may be loaded with different inks. In particular, electrographic printers such as electrostatographic or magnetographic printers may utilize different toners such as standard optical black toner, colored toner or magnetic ink character readable toner, which is also known in the art as MICR toner.

A further electrophotographic printer especially adapted for printing on a fanfold recording carrier is described in U.S. Pat. No. 5,778,297.

In many presently available printing systems document verification is not performed at all. However, there have been proposed printing systems with integrated qualification or inspection systems for the printed images. Such a system is described in U.S. Pat. No. 5,235,652. This system comprises a set of measurement modules which have sensors for forming various inspection functions such as image location and spacing measurements; image print contrast/intensity measurement; image skew angle measurements; image stroke width measurement; image edge variation measurement; image void measurement; image size and dimension measurement; image extraneous ink measurement and image curvature measurement.

If such a document verification system is to be introduced into a production printing line, various technical problems occur.

SUMMARY OF THE INVENTION

An object of the invention is to provide a system for inspecting printed documents comprising optical and magnetic information. More particularly, the information may be printed on a continuous web-shaped recording carrier. Still more particularly, the carrier may be fanfold paper.

According to a first aspect of the invention there is provided a method or a system for printing at least one of optical and magnetic information onto a continuous web-shaped recording carrier. The carrier comprises at least one of an optical recording zone and a magnetic recording zone. Magnetic information is printed by a printing station on the recording carrier using magnetic ink character readable toner (MICR toner). Optical information printed by the printing station is being tested by an optical inspection system and magnetic readable information printed by the printing station is being tested by a magnetic inspection system. Both the optical inspection system and the magnetic inspection system are located in-line to the printing line. In addition to at least one printing device, the printing line may comprise additional devices such as printer preprocessing unwinders or print postprocessing stackers, folders or cutters.

When a continuous web of recording material is used, such as paper unwound from a roll or fanfold paper input from a stack, the in-line inspection systems are located at any place of the printing line along the web, where the inspection system may be able to inspect information, which is printed on the web.

In a preferred embodiment of invention, the testing step is controlled by print stops of the printing station. In a still more preferred embodiment of the invention, the magnetic test equipment is mounted at an output zone of a printing device and in particular it is mounted at a stacker. Testing may comprise print quality, e.g. optical density or strength of magnetic field, as well as a print contents test.

According to another aspect of the invention, a system controller is provided, by which printing operation is selectively stopped for verification of recorded magnetic information on the carrier.

According to a still another object of the invention, three different scanning systems, in particular an optical camera system, a bar code scanning system and a reading device for magnetic ink are operating in combination. Signals of these three different scanning systems are captured by a data acquisition system and the data are processed by a data management system. According to this aspect of the invention, print quality inspection, document verification and document tracking may be performed. Print quality inspection may comprise, but is not limited to, optical density measurement, magnetic character signal level and signal uniformity across the document. Document verification may comprise but is not limited to comparison between predetermined data to be printed and data captured by the inspection system from the printed document. For that purpose an electronic comparison device may be connected to both an electronic print data source and the document test equipment.

According to the latter aspect of the invention, three different technologies are used to check or verify printed documents in a document production line. The first technology might comprise a vision system such as a CCD camera for checking optical information on the documents. The second technology may comprise a laser scanner for checking bar code information on the documents. The third technology may comprise a magnetic ink reading device to check magnetically coded information printed on the documents. Any information read from the documents is processed through an intelligent data acquisition system. An overall management system will use such data to allow high level client applications to display information, to support decision making based on them and to track documents passing through the printing system.

In particular, the invention is suitable for use in document printing lines which print magnetic information onto the documents. The printing line may comprise a printing device as disclosed in WO-A-99/24877, corresponding to U.S. Ser. No. 09/254,292. The printing device described therein is an electrophotographic printing device which prints magnetic ink character recognition toner (MICR toner) on documents. This US patent application is hereby incorporated by reference into the present disclosure.

According to a still further object of the invention, document tracking is performed. Document tracking implies the precise monitoring of the position of a particular document throughout the production line at any given time. Various checkpoints are arranged along a printing line for printing documents. At each checkpoint any document passing the checkpoint will be detected and its position and actual time are stored in a document tracking managing system. Thereby, the actual document position may be monitored at any given time.

In another aspect of the invention, a stand-alone box separate from the printer is provided for housing the MICR reader, bar code scanner, and CCD camera.

DESCRIPTION OF THE PREFERRED EMBODIMENTS

Figure 1:
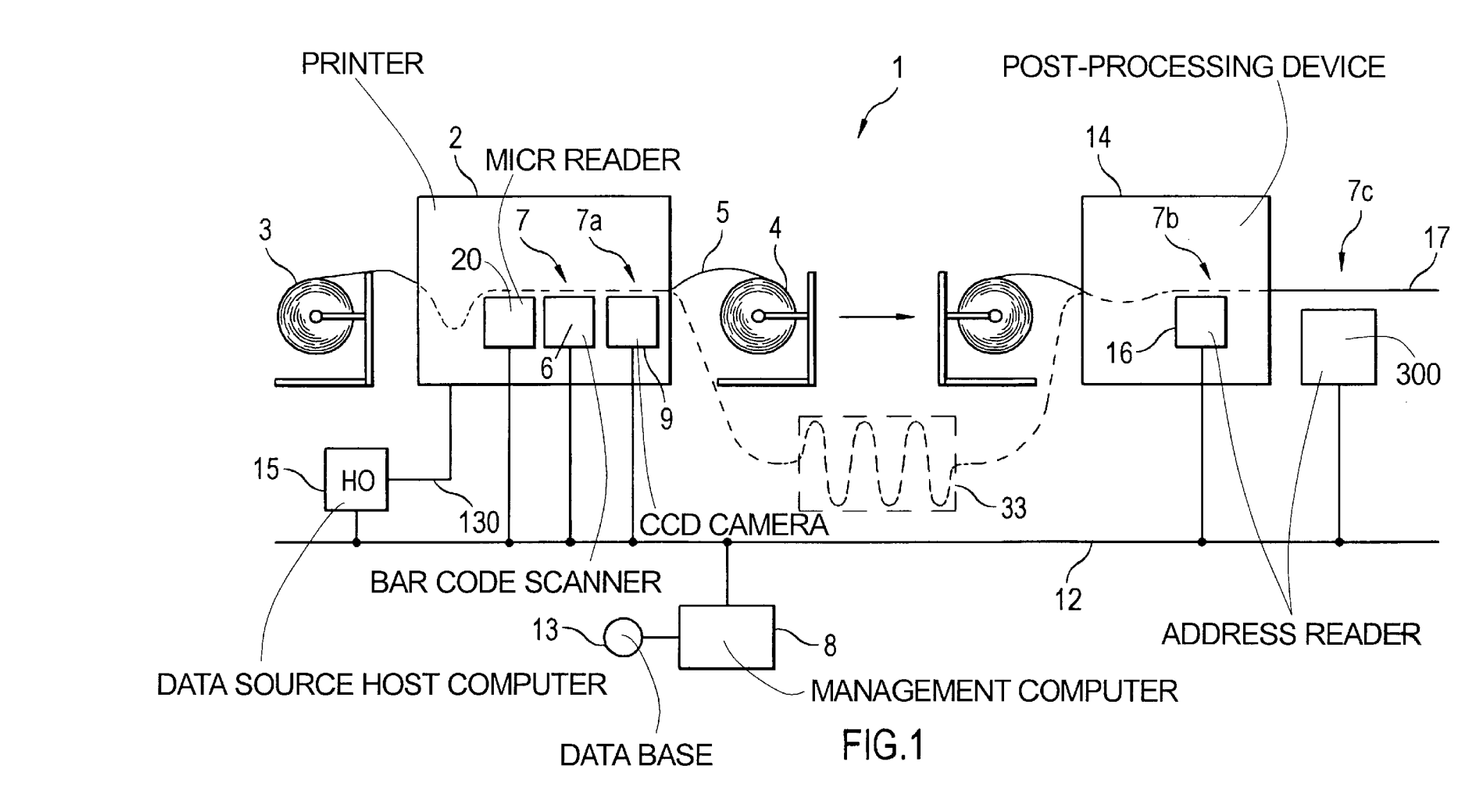
FIG. 1 illustrates a printing line.

In FIG. 1, a printing line 1 is shown comprising an electrophotographic printer 2, which receives paper from an unwinding roll 3 and delivers documents printed on fanfold paper web 5 to a winding roll 4. The printer 2 receives a print data stream from a data source 15 (host computer) via a direct data line 130 or via a state-of-the-art computer network (LAN,WAN) 12. Documents printed in the printer 2 are provided with a bar code and/ or magnetic characters. The bar code is read by a laser-based bar code scanner 6, which is located within the printer 2 or between printer 2 and winding roll 4. A MICR reader 20 may also be provided at printer 2 for reading the magnetic characters. Documents having passed the first checkpoint 7 are forwarded to a second checkpoint 7a, where optical information, that is, images or characters, printed on the paper web, are being checked by a CCD camera 9. Bar code scanner 6, CCD camera 9, and MICR reader 20 may exchange data with a workflow management computer 8 by a data line 12. Computer 8 and all equipment connected to the data line 12 are part of a local area network (LAN). This network may even be connected to a second, wide area network (WAN) such as world wide web (WWW). The networks may support state-of-the-art network protocols such as TCP/IP.

Workflow management computer 8 is connected to a data base 13, where specific production relevant data of the printing process are stored for further data processing. Relevant data such as location of specific documents, job numbers and statistical data may be stored in data base 13. Once the winding roll 4 is full, the roll will be docked to a post-processing device 14. Within this device, the documents are checked at a third checkpoint 7b by an address reader 16. Thereby, computer 8 receives information as to which document is currently being processed in the post-processing device 14. Within device 14 the printed fanfold paper web 5 is cut into individual single sheets and the printed document 17 is being folded and inserted into envelopes. The completed envelopes are forwarded to a fourth checkpoint 7c, where the addresses printed on the envelope are being checked. At checkpoint 7c addressed data are again forwarded by address reader 300 to management computer 8 for control of the document production process, i.e. for the workflow process. All of the checkpoints 7, 7a, 7b and 7c and the test equipment located at these checkpoints are arranged along the transport path of the paper web 5, i.e. they are located in-line with the printing line 1. In a slightly different embodiment, winding roll 4 is not used. Instead, the printing web may directly be fed from printer's 2 output to print postprocessing device 14 or through a paper buffer 33, which may buffer some thousand pages of documents.

Figure 2:
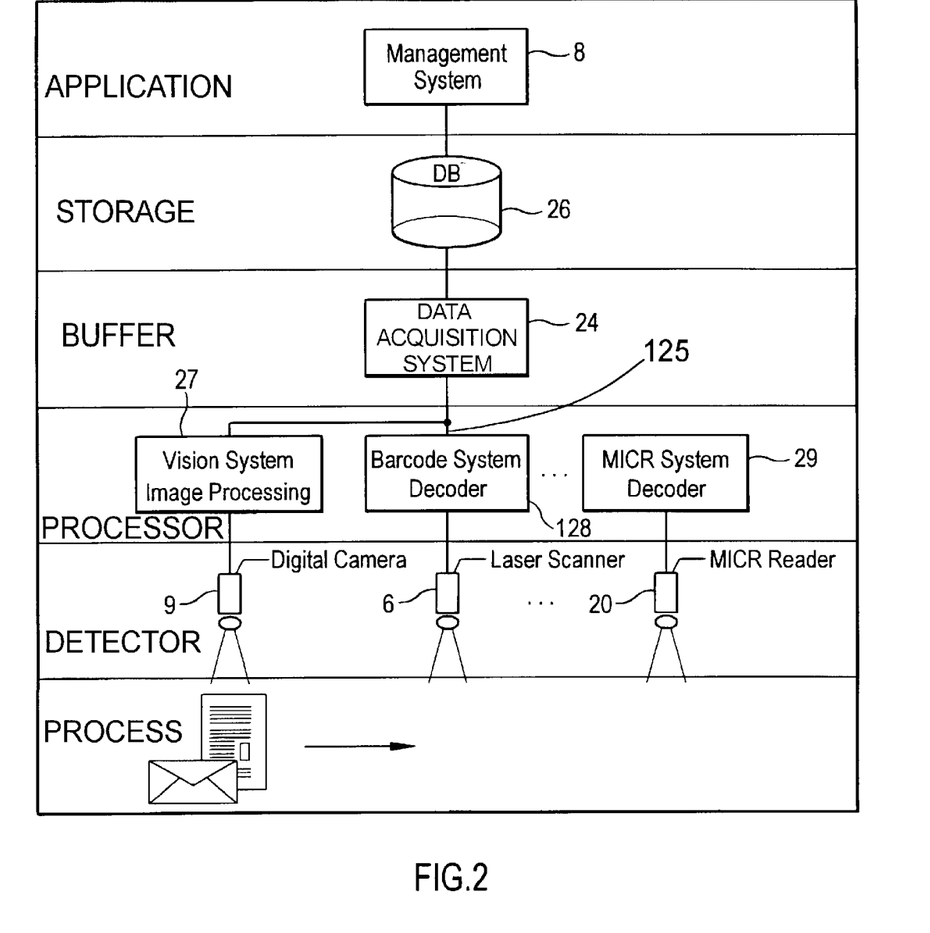
FIG. 2 illustrates a schematic illustration of electronic components for document verification and tracking.

FIG. 2 shows a workflow process and respective system components, which may be utilized for inspecting optical information printed on the documents, tracking the documents by printed bar code information and checking any magnetic information by a MICR system.

All three different inspection systems, i.e. CCD camera 9, laser scanning bar code reader 6 and MICR reader 20 have respective electronic equipment, which receives signals and processes these signals for further prosecution to a data acquisition system 24. That is, vision system 27 performs image processing of the data received from the digital camera 9, bar code system decoder 128 processes signals received from bar code laser scanner 6 and MICR system decoder 29 processes any data received from MICR reader 20. The data acquisition system 24 is a multi-threaded software program capable of reading and passing data sent by various scanning systems (camera, bar code, MICR) and storing the data into either a flat file or a data base in a form suitable for further processing. Dataline 125 may be part of local area network 12 or may be a separate serial line, e.g. RS232 or any other commonly used data line. The data processed in the data acquisition system 24 may be stored in a memory 26 and further processed by the management system, which may be the workflow management computer 8.

The bar code scanner 6 is a high speed laser bar code scanner which is able to scan in one-dimensional fashion as well as a two-dimensional bar code. Within the total printing line, different bar code scanners can be mounted at different locations. A first bar code scanner is mounted in-line with the printer and a second bar code scanner is located at any location of the production line following the electrophotographic printer.

Figure 3:
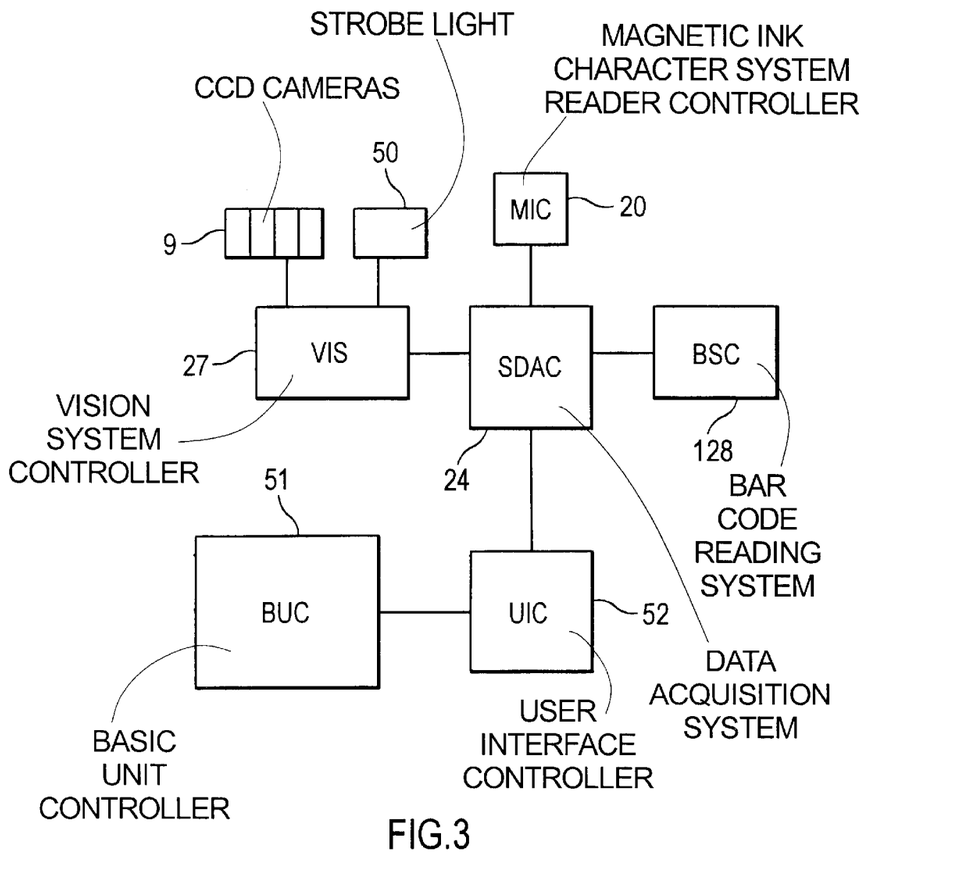
FIG. 3 System control components.

FIG. 3 shows a modulat structure of the test equipment and its connection to respective controllers.

Visioning System

As shown in FIG. 3, the vision system is based on four charge-coupled device (CCD) cameras 9 which inspect the whole width of the paper web 5 up to 18 inches, the paper web 5 being transported through the electrophotographic printer 2. The vision system controller VIS at 27 is also connected to a xenon strobe light 50. The vision system controller 27 synchronizes image capture of vision cameras 9 with high intensity light, which is strobed by the xenon strobe light. Each time the xenon light 50 is strobed, a digital image is taken. The actual strobing pulses are further synchronized with printer clock pulses provided by a basic control unit of the electrophotographic printer. Thereby, the precise location of the image is secured.

Once a digital image of the printed paper has been acquired, image processing can be performed by a software running on the vision system controller (VIS) 27. Image processing steps may include but are not limited to:

optical carrier recognition (OCR) to verify characters or texts. For that purpose, recognized characters on the printed physical output may be compared with predetermined data. Such predetermined data may in particular comprise data of the electronic data stream which has been provided from host 15 to the printer 2 for printing.

carrier analysis to detect carrier defects such as holes print quality measurement, e.g. grey level intensity check sequence number check for registration and tracking of documents. For that purpose, the vision system may read document identification data such as numbers printed on the documents on predetermined locations. The vision system compares these data with externally provided data (number sequences).

The vision system may also detect any bar code printed on the documents and use such information for tracking. logo verification. For that purpose, an image within a region of interest (ROI) is compared with a predetermined pattern. To perform these image processing steps, data for comparison may be provided by an external source. Respective data may also be provided from printer basic control unit 51. Alternatively, if one and the same information is repeatedly to be printed, respective data may be generated by a teach-in process, whereby the regularly printed information is stored in a memory within the vision system controller 27.

The results of these measurements are sent to the data acquisition system 24. In addition, the vision system controller 27 may be configured to stop the print line when certain definable criteria are met, e.g. if threshold values are exceeded or data trends are negative.

Bar Code Reading System

The bar code reading system may be utilized by a state-of-the-art laser scanner system which is capable of reading at least one-dimensional bar codes or even two-dimensional bar codes. Data obtained by the bar code reader system (BSC) 128 are passed to the data acquisition system SDAC 24, which processes the data and finally sends the processed data to management computer 8. The bar code may be mounted in-line with the printer 2 as shown in FIG. 1 or at any other arbitrary location of the printing line 1.

MICR Reading System To inspect information written with magnetic ink character reading (MICR) toner, the MICR reading system will provide the capability of proof-reading the MICR line on a document. Since in many printing applications MICR information is printed in a direction transverse to the transport direction of fanfold recording carrier web, the web has to be stopped to perform a MICR reading process. During the reading process, the MICR reading system is moved transversely across the printing web. The recording web and thus the document to be checked stand still during the MICR reading process.

The MICR reading system is in-line with the printing line (printing system), i.e. reading can be performed directly on the recording web within its path through the printing line. Thus, it is not necessary to cut a sample out of the web for proof-reading any MICR information. Thus, the MICR reading process can be performed at any time when the printing web within the printer is stopped. Whenever the printer is stopped manually or automatically (e.g. for a clean stop or for a pre/post-stop), the paper will be advanced or reversed automatically to a defined position so that the MICR read head 20 is aligned on the printed MICR line on the document. Afterwards, the proof-reading scan goes transversely across the paper or document. The MICR reading results will be provided by the MICR reading system controller 29 and may be displayed by a suitable display which is connected to the controller 29. Respective data are sent to the data acquisition system 24 and further processed by printer basic unit control 51 or user interface control 52.

Data Acquisition System

The data acquisition system 24 accepts data of the different test equipment (optical, bar code, MICR) and may send these data either to overall system computer 8 via a port and data line (RS 232) or via a network (LAN). Alternatively or in addition to sending it may store the information in a flat file or in a data base (e.g. SQL).

Management system Management system computer 8 stores a SQL data base. Any status information of the printed documents which are received from the data acquisition system are stored and updated in the SQL data base. The data are processed within the computer 8 by software which tracks the location (whereabouts) of any document which is currently processed by the printing production line 1. Computer 8 may comprise a graphical display for displaying status messages, document locations etc.. Additional functions such as reprinting documents or creating alerts can be performed by management system computer 8.

Figure 4:
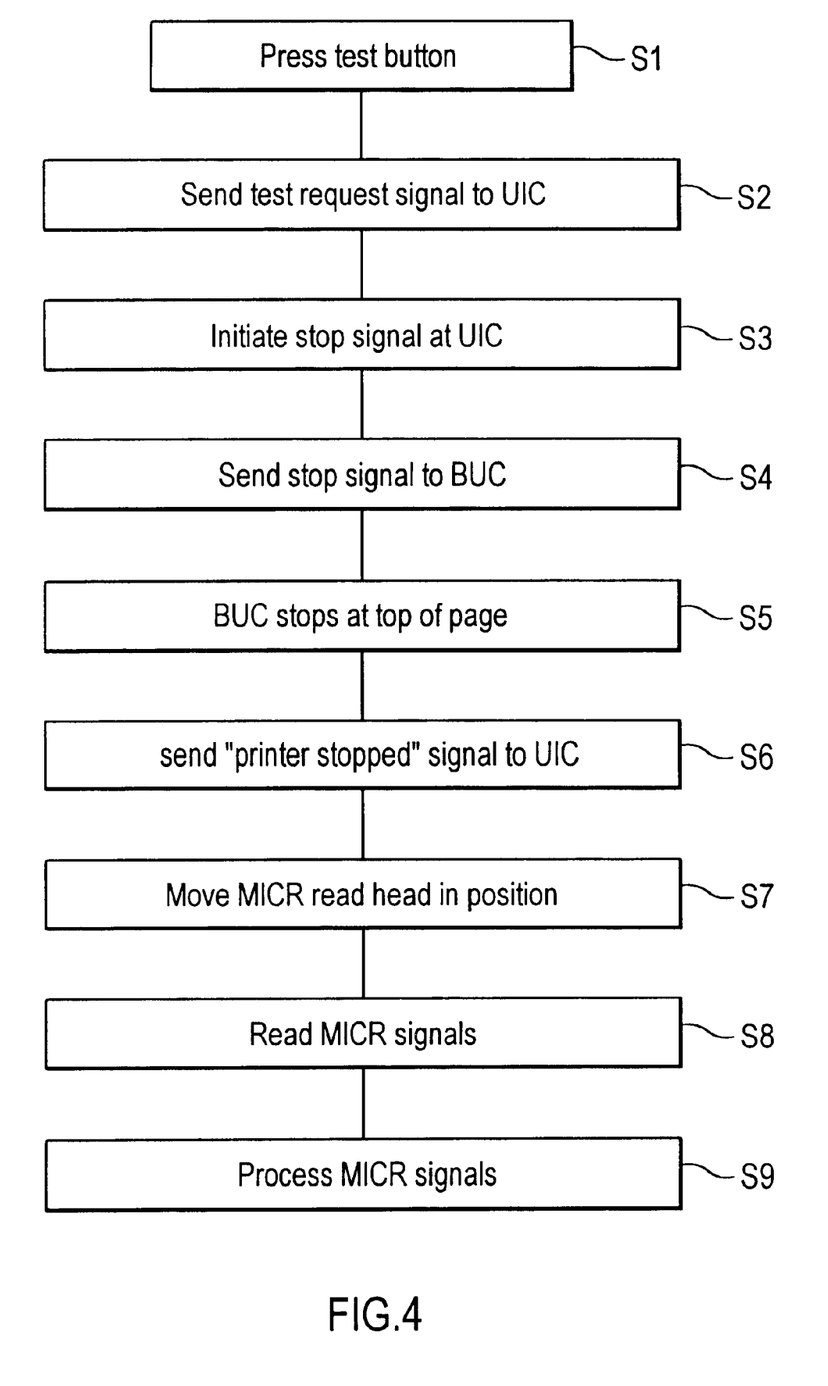
FIG. 4 is a flow chart illustrating process steps for MICR testing.

FIG. 4, a process for acquiring MICR data in a printing line as described above is demonstrated. By a first step S1 a test button is pressed at an input device (keyboard, touchscreen) which is connected to user interface controller (UIC) 52 (see FIG. 3). A test request signal is sent to user interface controller 52 (step S2). User interface controller 52 then generates a stop signal (S3) and sends this signal by step S4 to basic unit controller (BUC) 51 (see FIG. 3). Upon receipt of the stop signal, the basic unit controller checks the current position of the recording carrier 5 within the printer 2 and stops the carrier at a p redetermined position, e.g. at a position, in which top-of-next-page is at the location of MICR reader 20 (step S5). Thereafter, steps S6 to S9 occur as shown in FIG. 4.

Figure 5:
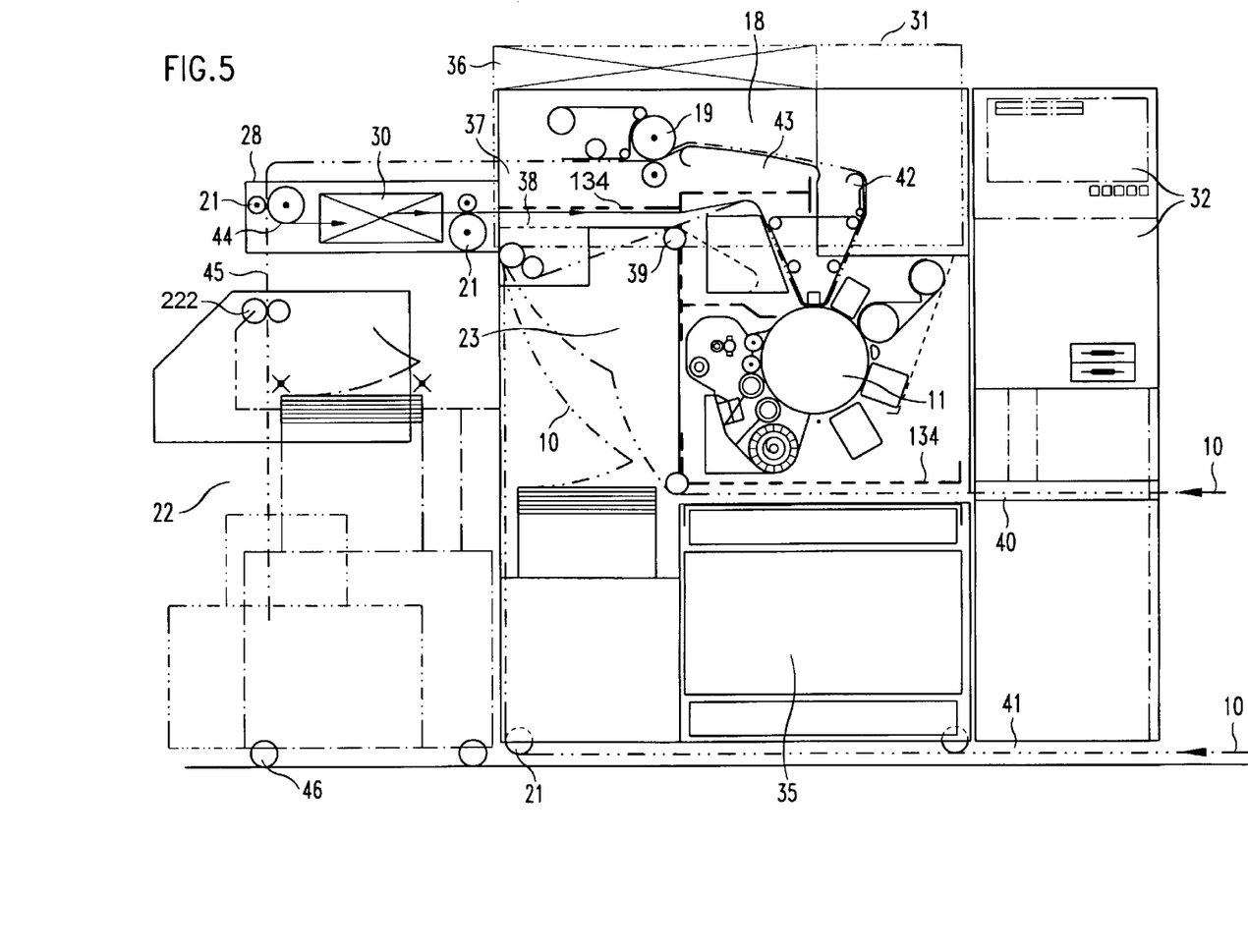
FIG. 5 illustrates components of an electrophotographic printer.

FIG. 5 shows a printing device according to a still further embodiment. Instead of unwinding and winding rolls, this printer utilizes fanfold paper stacks. A paper web is thereby put in from an input stack and put out to an output stack into a movable outputstacker. Further details of this printer are disclosed in U.S. Pat. No. 5,778,297. The contents of this patent are hereby incorporated by reference to the present disclosure.

The multi-functional printer device is composed of a central printer module 31 with deflection unit 28 adapted thereto and an accompanying, mobile stacker unit 22, as well as of a control module 32 with operating surface. The printer module 31 is constructed as a distortion-stable torsion box. To this end, two lateral sheet steel billets extending to the floor are connected to one another via intervening traverse elements 134 in the form of extruded aluminum profiles to form a torsionally rigid supporting framework. This serves, among other things, for the acceptance of the core electrophotographic units 11, namely an intermediate carrier unit (photoconductive drum) generating the toner images, charging unit, character generator, developer station, transfer printing station, cleaning station, discharge unit and fixing station 18. The individual units are thereby suspended in the lateral billets, as a result whereof a high-precision allocation of the units to one another is achieved. The risk of paper running faults due to misalignment is thereby reduced during operation of the printer device. Repeated readjustment is thus eliminated. The allocation stability is further enhanced in that stable unit sub-modules are formed via the cross-bracings 134 allocated to the individual units. For example, in the form of a fixer module 18, a photoconductor module, a region for the supply stack 23 and a region for the acceptance of the device electronics 35.

For forming a service-friendly, compact printer structure, the individual units are arranged such within the printer module such that, on the one hand, the throughput path of the paper web 10 becomes optimally short and, on the other hand, the heat required for the fixing process does not negatively influence the units or, respectively, the paper web. For this purpose, the fixing station 18 is arranged in the uppermost region of the printer module above the unit (intermediate carrier 11) that generates the toner images. The heat arising during fixing, including the substances exhaled by the paper, are immediately extracted via a vapor extraction hood 36. The paper web traverses the fixing station 18 nearly horizontally and leaves the printer module via a paper output channel 37. A return channel 38 that likewise proceeds horizontally is located under the fixing station for returning the narrow recording medium that has been deflected and/or turned over via the deflection unit 28. In a feed region to the photoconductor module, the return channel 38 is in communication with a delivery channel 39 for recording media of different tape widths. The recording medium 10 is supplied to the photoconductor module via this delivery channel 39 proceeding from a supply region, for example the supply stack 23. Further, external delivery channels 40, 41 that 40 cut through the printer module or lead 41 around the printer module are also provided in order to be able to supply the recording medium to the photoconductor module proceeding from an external supply stack. The entire paper path through return channel 38, photoconductor module and fixing station 18 is designed such that an optimally short paper running distance derives and such that the recording medium is supplied approximately horizontally to the deflection unit 28 and passes therethrough roughly horizontally. The following cooling path thus becomes arbitrarily large and can be freely designed. A complicated production of cooling air is thus eliminated.

Conveyed by a conveyor unit, the paper web leaves the transfer printing station steeply upward, is deflected by 60–90° via a looper 42 and by up to 45° more via a saddle 43, and passes through the fixing drums 19,222 nearly horizontally. Since the minimum wrap angles of looper 42 and saddle 43 are functionally predetermined, it is beneficial for achieving such a horizontal feed attitude when the transfer printing station is arranged roughly in the middle above the photoconductive drum 11.

The deflection unit 28 is likewise fashioned as a module that can be coupled to the paper output channel 37 and the return channel 38 of the printer module via releasable fastening unit, for example screw-type or snap-in closures. It contains guide rollers 21 and, as a separate structural unit, a turn-over unit 30. This turn-over unit 30 can likewise be detachably secured on carriers of the deflection unit and, for example, can be pulled out via hinges. It is freely accessible, so that disturbances in paper running can be eliminated without parting the paper web.

The deflection unit 28 also contains a manually or motor controllable shunt 44 via which the recording medium 10, proceeding from the paper output channel, is supplied via the deflection unit to the return channel 38 in a first operating mode of the printer device for multiple printing of the narrow recording medium 10, and, after another pass through the unit that generates toner images, is supplied to the mobile stacker unit 22 via an output channel 45 allocated to the deflection unit. The mobile stacker unit 22 provided with rollers 46 and/or the sidewall of the printer module can comprise fit elements that enable a positionally exact seating of the stacker unit 22 against the printer module. The deflection unit 28 can likewise be part of the stacker unit 22. A MICR reader 20 is mounted on a plate at the stacker 22, which will be described in more detail later with reference to FIG. 6.

Figure 6:
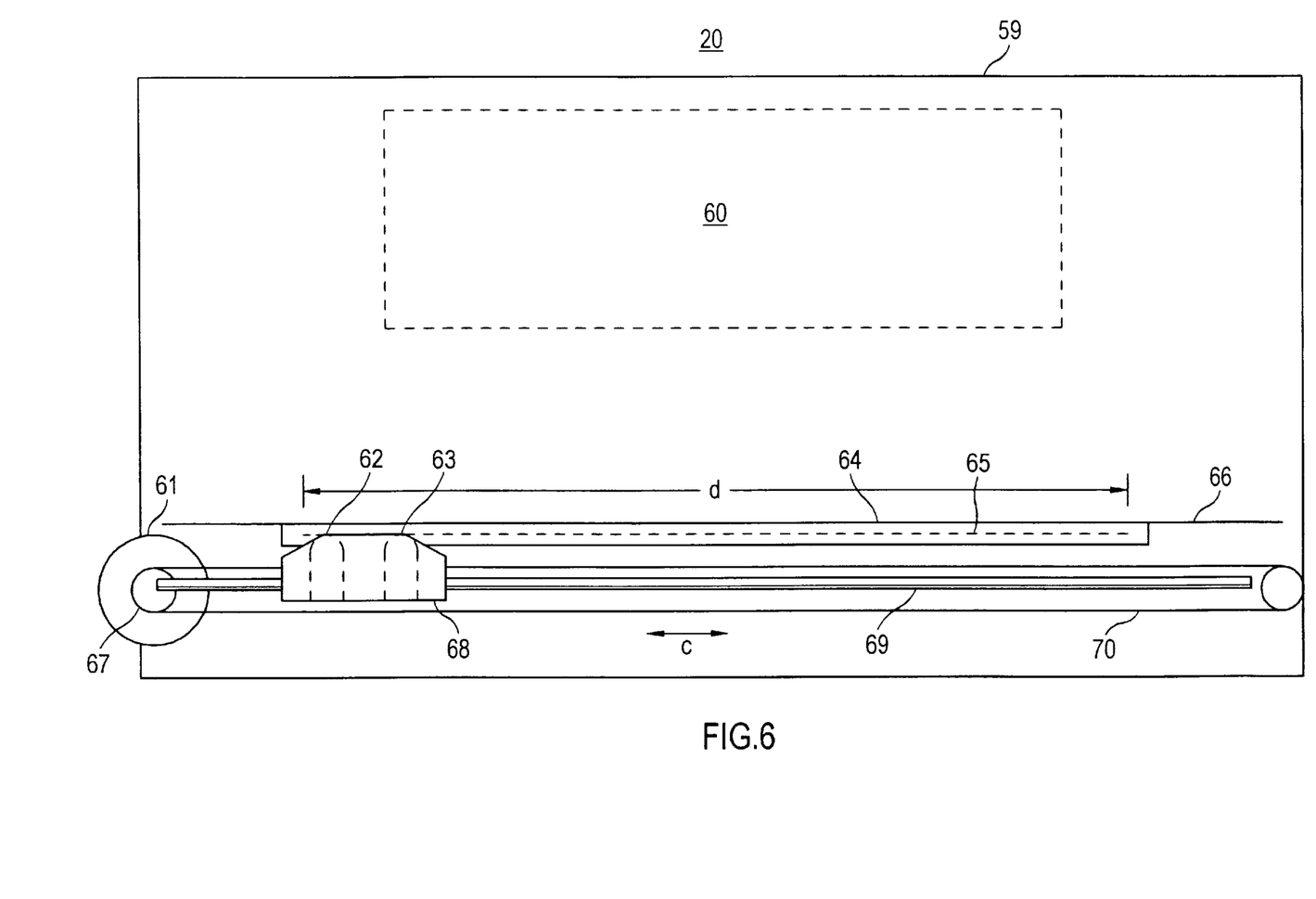
FIG. 6 illustrates an MICR testing device mounted at a stacker.

FIG. 6 shows the MICR reading device 20 as it is mounted on the stacker 22. The paper web 65 passes along the stacker through a paper slot 64. The reading device 20 is mounted to a stacker top plate 59 and comprises a drive mechanism 61, 67 as well as a carrier 68 carrying magnetic read/write heads 62, 63. The paper web 65 having width d (up to 18") is stopped and correctly positioned relative to the reading device 20 (see FIG. 4). The MICR head carrier 68 is then transported by motor 61, drive pulley 67 and drive cable 70 across the paper width along axis C. During that movement, the MICR read head 62 reads magnetic information provided on the paper web and produces analog reading signals. The movement of the MICR head carrier 68 is guided by carrier guide rail 69. To support the paper web 65 and the MICR head carrier 68 during the reading process, a paper backup plate 66 is provided. Thereby, the reading process is enhanced, since the paper web is kept in position during the reading step. The analog signals provided by MICR read head 62 are forwarded to MICR electronic device 60, which is mounted to stacker top plate 59. Device 60 forwards data in digitized format to data acquisition system 24. MICR write head 63 may be utilized to write or update MICR data on the documents at the stacker.

When the paper web stops at a top-of-page position, the MICR head carrier 68 cycles across the continuous form on demand, reading all magnetically coded characters of the respective documents. Within the electronic device 60 the ANSI (American National Standards Institute) conformance of the read characters is proved and reported to serial data acquisition system 24. Given ANSI compliance of the MICR print, the software in the management system computer 8 will generate a predominately green signal-strength bar graph display, recommending to the operator an immediate resumption of printing. A non-compliance test result will generate a yellow or red bar graph display and allow further screens to be accessed to identify the nature of the MICR print problem. In either case, results can be automatically stored, reports printed, and ASCII MICR line data saved for production control purposes.

According to the invention, the printing device may use a changeable developer station, whereby a quick change between a first developer station and a second developer station can be performed. While the first developer station may use optical readable toner, the second developer station may use a MICR toner. Such a printing station is described in WO-A-99/24877, the disclosure of which is hereby also incorporated by reference to the present disclosure.

The invention provides a comfortable printing system comprising in-line test equipment for character recognition both optical and magnetical as well as bar code scanning. With such a system document verification and document-tracking in a printing production line can be performed to enhance print quality assurance. The embodiment as described comprises a magnetic head mounted to a printer in the region of a stacker. Of course, such magnetic read carrier may be utilized at any other position within a printing line, in which precise stop position of the paper may be utilized. Alternative embodiments may provide a magnetic read head in a buffer whereby the recording web may be stopped for reading while printing is continued. During the test steps, newly printed material would be fed into the buffer thereby increasing the amount of carrier within the buffer.

In still further embodiments, a magnetic read head may be fixed to a carrier and the paper being advanced across the read head. The magnetic attributes of the printed density marking blocks at the edge of the continuous form would then be detected while the form would be in motion. According to such embodiments, a magnetic read head assembly may be fixed in position in the stacker area of a printer or in a turn-bar mechanism of a printer.

Figure 7:
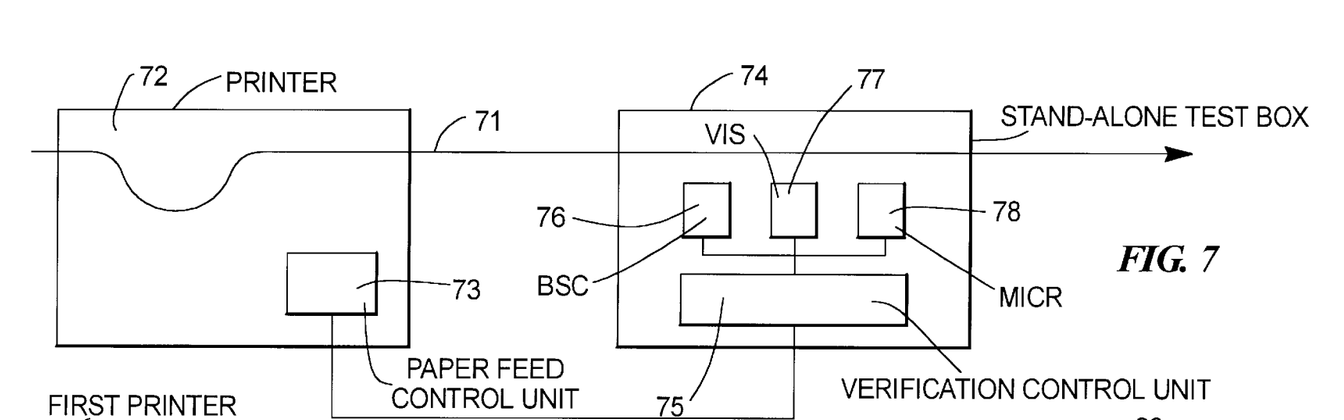
FIG. 7 illustrates schematically a stand-alone box for housing MICR reader, bar code scanner, and CCD camera separate from the printer.

In the further embodiment of FIG. 7, the printer applying the bar codes, visual indicia, and/or magnetic ink characters similar to FIG. 1 is shown at 72. The paper web 71 is fed through this printer according to a paper feed control unit 73. Thereafter, in a separate stand-alone test box 74, a bar code scanner with associated bar code system decoder (BSC) is provided at 76; a digital CCD camera together with an associated vision system controller (VIS) is provided at 77; and an MICR reader together with an associated MICR system control (MICR) are provided at 78. These units connect to a verification control unit 75 linked to the paper feed control unit 73.

Thus, the stand-alone box of FIG. 7 contains all equipment needed for inspection (MICR, bar code, and visual inspection).

Figure 8:
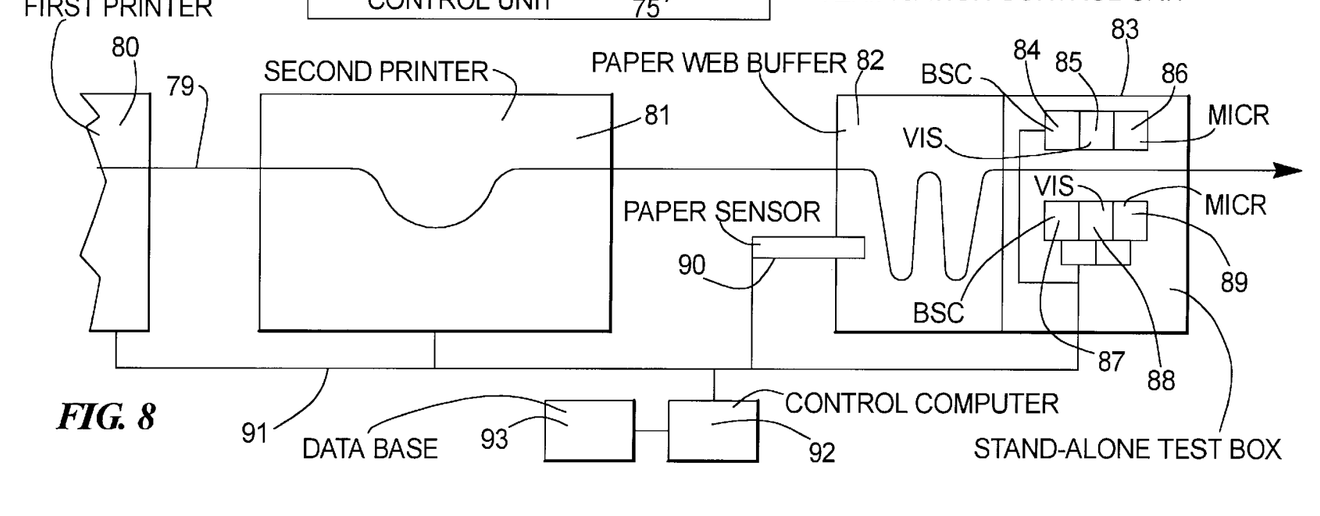
FIG. 8 schematically illustrates a stand-alone box containing an MICR reader, bar code scanner, and CCD camera at each of opposite sides of the paper web.

As shown in another embodiment in FIG. 8, the inspection equipment may be provided twice, that is at the top and bottom of the web paper 79. As shown in FIG. 8, a first printer 80 is provided together with a second printer 81. These printers then apply the visual characters, bar code, and/or magnetic ink characters. These first and second printers 79 and 81 may be printing on opposite sides of the web paper. Thereafter, a paper buffer 82 is provided having a paper sensor 90. Then the stand-alone test box 83 is provided having above the paper web the BSC 84, VIS 85, and MICR 86 units described with respect to FIG. 7. Similar units 87, 88 and 89 are provided below the paper web. A data bus 91 is provided connecting to the first and second printers and to the paper sensor, and to the aforementioned sensor/controllers 84, 85, 86, 87, 88, and 89 so that data flow can be controlled by a control computer 92 connected to a data base 93.

By providing the inspection equipment twice, that is at the top and bottom of the fanfold paper tray, duplex printer paper may be scanned in one pass.

To synchronize print stops of the printer, marks can be printed regularly (for instance every 10, 50, or 1000 pages) on the paper to signal a position. A respective entry to the control computer 92 is made. The marks may be used for precise positioning of the paper at the verification equipment within the stand-alone box 83.

The mark together with the paper buffer is positioned before the stand-alone box as shown in FIG. 8. This allows holding a position while the verifying equipment reads the document without slowing down the printer—that is it would be possible that the printer starts again, before the precise positioning and verification steps have been finished. According to FIG. 8, the buffer and/or stand-alone box may contain paper transport elements (motor, rollers, sensors and control units for driving the positioning).

Other verification technology such as ultrasound verification, or IR light verification to detect mechanical paper damage, can be added to the stand-alone box.

There are many advantages to the stand-alone box system shown in FIGS. 7 and 8. No synchronization problems occur between the first and second printers of the twin system because you are viewing both the top and bottom of the same page at the same time. The system can handle simplex or duplex prints with 100% assurance of accuracy. The system can handle one-wide or two-wide documents or both by adjusting a paper guide. The stand-alone box is more accurate, rigid and dependable than hanging the test equipment at the back end of the printer as in FIG. 1. The stand-alone box can be attached to any continuous web printer. The stand-alone box can be attached to unwinders, rewinders, and sorting devices, and just about anything that has a paper web. Other attachments can be added to the stand-alone box such as an MICR verifier. The stand-alone boxes are an economical design for large customers with many printers. Finally, the stand-alone box would not have to be locked to a single printer. Since it does its own registration, it can be made portable and moveable to another printer for backup.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for printing at least one of optical and magnetic information onto a continuous web-shaped recording carrier in a printing line, the carrier comprising at least one of an optical recording zone and a magnetic recording zone, comprising the steps of:
   printing the optical information onto the recording carrier using optical readable toner or printing the magnetic information being printed onto the recording carrier using magnetic ink character recognition toner; and
   testing by using at least one of a magnetic test equipment for inspection and an optical image test equipment for inspection and wherein both the magnetic test equipment and the optical image test equipment are located in the printing line and wherein at least one of the test equipments is used after a print stop has been initiated.

2. The method according to claim 1, wherein at least one of the testings is performed during a print stop.

3. The method according to claim 1 wherein the testing step is controlled by a controller which initiates print stops.

4. The method according to claim 1 wherein bar codes printed on the recording carrier are read by bar code equipment.

5. The method according to claim 4 wherein signals generated by at least one of the magnetic test equipment, the bar code read equipment, and the optical image test equipment are used for document tracking.

6. The method according to claim 1 wherein the recording carrier is transported to a predetermined position with respect to at least one of the magnetic and optical image test equipments before the inspection step is initiated.

7. The method according to claim 6 wherein the predetermined position with respect to at least one of the magnetic and optical image test equipments is a top-of-page position.

8. The method according to claim 1 including the step of providing the magnetic test equipment and the optical image test equipment in a same box which houses a printing station for at least one of the magnetic information and the optical information.

9. The method according to claim 1 including the step of providing the magnetic test equipment and the optical image test equipment in a stand-alone box separate from a housing containing a printer for at least one of the magnetic information and the optical information.

10. A printing line, comprising
a printing device for printing at least one of optical and magnetic information onto a continuous web-shape recording carrier, the information being provided as a data stream from an electronic data source, the carrier comprising at least one of an optical recording zone and a magnetic recording zone;
an optical image test equipment for inspection located in line with the printing line and adapted to inspect print quality or to recognize printed contents of a document;
a magnetic test equipment for inspection located in line with the printing line and adapted to detect magnetic information printed on the recording carrier;
the test equipments are located at an output path of the printing device; and
the optical image test equipment and the magnetic test equipment being located in a box with the printing device.

11. A printing line, comprising:
a printing device for printing at least one of optical and magnetic information onto a continuous web-shape recording carrier, the information being provided as a data stream from an electronic data source, the carrier comprising at least one of an optical recording zone and a magnetic recording zone;
an optical image test equipment for inspection located in line with the printing line and adapted to inspect print quality or to recognize printed contents of a document;
a magnetic test equipment for inspection located in line with the printing line and adapted to detect magnetic information printed on the recording carrier;
the test equipments are located at an output path of the printing device; and
the optical image test equipment and the magnetic test equipment being located in a stand-alone box separate from the printing device.

12. A printing line, comprising
a printing device for printing at least one of optical and magnetic information onto a continuous web-shape recording carrier, the information being provided as a data stream from an electronic data source, the carrier comprising at least one of an optical recording zone and a magnetic recording zone;
an optical image test equipment for inspection located in line with the printing line and adapted to inspect print quality or to recognize printed contents of a document;
a magnetic test equipment for inspection located in line with the printing line and adapted to detect magnetic information printed on the recording carrier;
the test equipments are located at an output path of the printing device; and
first and second printing devices being provided and the optical image test equipment and the magnetic test equipment being located in a stand-alone box after the second printing device.

13. A method for printing at least one of optical and magnetic information onto a continuous web-shaped recording carrier in a printing line, the carrier comprising at least one of an optical recording zone and a magnetic recoding zone, comprising the steps of:
printing the optical information onto the recording carrier using optical readable toner or printing the magnetic information being printed onto the recording carrier using magnetic ink character recognition toner; and
testing by using at least one of magnetic test equipment for inspection and an optical image test equipment for inspection and wherein both the magnetic test equipment and the optical image test equipment are located in the printing line, and wherein the testing step is controlled by a controller which initiates print stops.

14. The method according to claim 13 wherein the magnetic test equipment and the optical image the equipment are located in a same box as a printing station for at least one of the optical information and the magnetic information.

15. The method according to claim 13 wherein the magnetic test equipment and the optical image test equipment are located in a stand-alone box separate from a printing station for at least one of the optical information and the magnetic information.

16. The method according to claim 13 wherein at least one of the testings is performed during a print stop.

17. A printing line, comprising:
a printing device for printing at least one of optical and magnetic information onto a continuous web-shape recording carrier, the information being provided as a data stream from an electronic data source, the carrier comprising at least one of an optical recording zone and a magnetic recording zone;
an optical image test equipment for inspection located in line with the printing line and adapted to inspect print quality or to recognize printed contents of a document;
a magnetic test equipment for inspection located in line with the printing line and adapted to detect magnetic information printed on the recording carrier;
a character recognition device connected to a document contents verification unit which is adapted to compare the information detected by the character recognition device with the information provided as a data stream from the electronic data source; and
the optical image test equipment and the magnetic test equipment being located in the stand-alone box separate from the printing device.

18. A printing line, comprising:
a printing device for printing at least one of optical and magnetic information onto a continuous web-shape recording carrier, the information being provided as a data stream from an electronic data source, the carrier comprising at least one of an optical recording zone and a magnetic recording zone;
an optical image test equipment for inspection located in line with the printing line and adapted to inspect print quality or to recognize printed contents of a document;
a magnetic test equipment for inspection located in line with the printing line and adapted to detect magnetic information printed on the recording carrier;

a controller which controls a carrier transport unit to transport the recording carrier upon receipt of a test signal to a predetermined position with respect to at least one of the test equipments before the testing step is initiated; and the magnetic test equipment and the optical image test equipment being located in a same box as the printing device.

19. A printing line; comprising;

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located in line with the printing line and adapted to inspect print quality or to recognize printed contents of a document;

a magnetic test equipment for inspection located in line with the printing line and adapted to detect magnetic information printed on the recording carrier;

a controller which controls a carrier transport unit to transport the recording carrier upon receipt of a test signal to a predetermined position with respect to at least one of the test equipments before the testing step is initiated; and the optical image test equipment and the magnetic test equipment being located in a stand-alone box separate from the printing device.

20. The printing line according to claim 19 wherein the magnetic test equipment and the optical image test equipment are provided at both sides of the web-shape recording carrier.

21. A printing line, comprising:

a printing device for printing at least one of optical and magnetic information onto a continuous web-shape recording carrier, the information being provided as a data stream from an electronic data source, the carrier comprising at least one of an optical recording zone and a magnetic recording zone;

an optical image test equipment for inspection located in line with the printing line and adapted to inspect print quality or to recognize printed contents of a document;

a magnetic test equipment for inspection located in line with the printing line and adapted to detect magnetic information printed on the recording carrier;

a controller which controls a carrier transport unit to transport the recording carrier upon receipt of a test signal to a predetermined position with respect to at least one of the test equipments before the testing step is initiated; and the optical image test equipment comprises a bar code scanner and a CCD camera and the magnetic test equipment comprises a magnetic image character reader.

22. A method for printing at least an optical information onto a continuous web-shaped recording carrier in a printing line, the carrier comprising at least an optical recording zone, comprising the steps of:

printing the optical information by a printing station onto the recording carrier using optical readable toner;

testing by using at least an optical image test equipment for inspection and wherein the optical image test equipment is located in line in the printing line;

inspecting with the optical image test equipment a front and a backside of the recording carrier with respective optical sensors positioned at the front and the backside of the carrier; and the optical image test equipment comprises a first video camera at a front side and a second video camera at a backside of the line recording carrier.

23. A testing device for use in a printing line, said printing line having a printing device for printing at least one of optical and magnetic information onto a web-shape recording carrier, the carrier having at least one of an optical recording zone and a magnetic recording zone, comprising:

a stand-alone box having contained inside thereof an optical image test equipment for inspecting the optical recording zone and a magnetic test equipment for inspecting the magnetic recording zone.

24. The testing device according to claim 23 wherein the stand-alone box is adapted for mounting at an output path of the printing device but separate from the printing device.

25. The testing device according to claim 23 wherein the stand-alone box is located in line with the printing line.

26. The testing device according to claim 23 wherein the optical image test equipment is located in line with the printing line and is adapted to inspect print quality or to recognize printed contents on the recording carrier, and the magnetic test equipment is located in line with the printing line and is adapted to detect magnetic information printed on the recording carrier.

27. The testing equipment according to claim 23 wherein the stand-alone box contains a bar code reading equipment which reads printed bar code information from the recording carrier.

28. The testing equipment according to claim 23 wherein the stand-alone box contains a CCD camera.

29. The testing equipment according to claim 23 wherein the stand-alone box contains a magnetic ink character recognition reader.

30. The testing equipment according to claim 23 wherein the stand-alone box contains a digital camera, a laser scanner, and a magnetic ink character recognition reader.

31. The testing device according to claim 23 wherein the optical image test equipment and the magnetic test equipment are provided at both opposite sides of the recording carrier in the stand-alone box.

32. A testing device for use in a printing line, said printing line having a printing device for printing at least one of optical and magnetic information onto a web-shape recording carrier, the carrier having at least one of an optical recording zone and a magnetic recording zone, comprising:

a stand-alone box having contained inside thereof an optical image test equipment for inspecting the optical recording zone and a magnetic test equipment for inspecting the magnetic recording zone; and the stand-along box being mounted separate from the printing device but in-line in the printing line.

33. A method for testing in a printing line, comprising the steps of:

providing a printing device for printing at least one of optical and magnetic information onto a web-shape recording carrier, the carrier having at least one of an optical recording zone and a magnetic recording zone;

positioning a stand-alone box at a location after and separate from the printing device and having contained inside thereof an optical image test equipment for inspecting the optical recording zone and a magnetic test equipment for inspecting the magnetic recording zone; and inspecting at least one of the optical recording zone and the magnetic recording zone with the optical and magnetic test equipment.

34. The method according to claim 33 including the step of inspecting the at least one of the optical recording zone and the magnetic recording zone in in-line fashion with the printing line.

35. A method for printing at least an optical information onto a continuous web-shaped recording carrier in a printing line, the carrier comprising at least an optical recording zone, comprising the steps of:

printing the optical information by a printing station onto the recording carrier using optical readable toner;

testing by using at least an optical image test equipment for inspection and wherein the optical image test equipment is located in line in the printing line; and storing portions of the recording carrier after it has been printed by the printing station in a paper buffer.

36. The method of claim 35 wherein the paper buffer is separate from the printing station.

37. The method of claim 35 wherein the optical image test equipment is located in a stand-alone box in an output path of the printing station but separate from the printing device.

38. The method according to claim 35 including the step of using the test equipment after a print stop of the printing station has been initiated.

39. A system for printing at least an optical information onto a continuous web-shaped recording carrier in a printing line, the carrier comprising at least an optical recording zone, comprising:

a printing station for printing optical information onto the recording carrier using optical readable toner;

an optical image test equipment for inspection, the optical image test equipment being located in line in the printing line; and a paper buffer separate from the printing station for storing portions of the recording carrier after it has been printed by the printing station.

40. The system according to claim 39 wherein the optical image test equipment is located in a stand-alone box in an output path of the printing device but separate from the printing station.

41. A method for printing at least an optical information onto a continuous web-shaped recording carrier in a printing line, the carrier comprising at least an optical recording zone, comprising the steps of:

printing the optical information by a printing station onto the recording carrier using optical readable toner;

testing by using at least an optical image test equipment for inspection and wherein the optical image test equipment is located in line in the printing line;

inspecting with the optical image test equipment a front and a backside of the recording carrier with respective optical sensors positioned at the front and the backside of the carrier; and the test equipment is used after a print stop of the printing station has been initiated.

42. A method for printing optical information onto a continuous web-shape recording carrier in a printing line, the carrier comprising at least an optical recording zone, comprising the steps of:

printing the optical information by a printing station onto the recording carrier using optical readable toner;

testing by using an optical image test equipment for inspection, the optical image test equipment being located in line in the printing line; and the testing with the optical image test equipment includes the step of sending data into at least one of a flat file and a data base to store and update the at least one of flat file and data base in a management computer, and to display at least one of status messages and document locations by the computer.

43. A method according to claim 42 including the step of locating the optical image test equipment in a stand-alone box in an output path of the printing station but separate from the printing device.

44. A method for printing an optical information onto a continuous web-shape recording carrier in a printing line, the carrier comprising at least an optical recording zone, comprising the steps of:

printing the optical information by a printing station onto the recording carrier using optical readable toner;

testing by using at least an optical image test equipment for inspection, the optical image test equipment being located in line in the printing line; and providing said optical image test equipment with a data acquisition system for multi-threaded software capable of reading and passing data sent by a plurality of scanning systems and storing the data into at least one of a flat file and a data base in a form suitable for further processing.

45. The method according to claim 44 including the step of locating the optical image test equipment in a stand-alone box in an output path of the printing station but separate from the printing device.

46. A method for printing at least one of optical, bar code, and magnetic information onto a continuous web-shaped recording carrier in a printing line, the carrier comprising at least one of an optical, bar code, and magnetic ink recording zone, comprising the steps of:

printing at least one of the optical, bar code, and magnetic ink information by a printing station onto the recording carrier;

testing by using at least one of an optical image, bar code, and magnetic ink test equipment for inspection and wherein the at least one of the optical image, bar code, and magnetic ink test equipment is located in line in the printing line; and storing portions of the recording carrier after it has been printed by the printing station in a paper buffer.

47. A method for printing at least one of optical, bar code, and magnetic ink information onto a continuous web-shape recording carrier in a printing line, the carrier comprising at least one of an optical, bar code, and magnetic ink recording zone, comprising the steps of:

printing at least one of the optical, bar code, and magnetic ink information by a printing station onto the recording carrier;

testing by using at least one of an optical image, bar code, and magnetic ink test equipment for inspection, at least one of the optical image, bar code, and magnetic ink test equipment being located in line in the printing line; and the testing with the at least one of the optical image, bar code, and magnetic ink test equipment includes the step of sending data into at least one of a flat file and a data base to store and update the at least one of the flat file and data base in a management computer, and to display at least one of status messages and document locations by the computer.

48. A method for printing at least one of an optical, bar code, and magnetic ink information onto a continuous web-shape recording carrier in a printing line, the carrier comprising at least one of an optical, bar code, and magnetic ink recording zone, comprising the steps of:

printing the at least one of the optical, bar code, and magnetic ink information by a printing station onto the recording carrier;

testing by using at least one of an optical image, bar code, and magnetic ink test equipment for inspection, the at least one of the optical image, bar code, and magnetic ink test equipment being located in line in the printing line; and providing the at least one of the optical image, bar code, and magnetic ink test equipment with a data acquisition system for multi-threaded software capable of reading and passing data sent by a plurality of scanning systems and storing the data into at least one of a flat file and a data base in a form suitable for further processing.

* * * * *